US008171407B2

(12) United States Patent
Huang et al.

(10) Patent No.: US 8,171,407 B2
(45) Date of Patent: May 1, 2012

(54) RATING VIRTUAL WORLD MERCHANDISE BY AVATAR VISITS

(75) Inventors: Yunwu Huang, Chappaqua, NY (US); Jalal Uddin Mahmud, Centereach, NY (US); Roger Alan Pollak, Pleasantville, NY (US); John J. Ponzo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 12/035,255

(22) Filed: Feb. 21, 2008

(65) Prior Publication Data
US 2009/0216546 A1  Aug. 27, 2009

(51) Int. Cl.
  *G06F 3/048* (2006.01)
(52) U.S. Cl. .................... 715/706; 715/705; 705/347
(58) Field of Classification Search .................. 715/706, 715/705; 705/347
See application file for complete search history.

(56) References Cited

U.S. PATENT DOCUMENTS

| | | | |
|---|---|---|---|
| 6,366,285 B1 | 4/2002 | Brush, II et al. | |
| 6,954,906 B1 | 10/2005 | Kamachi et al. | |
| 7,089,083 B2 | 8/2006 | Yokoo et al. | |
| 7,250,944 B2 | 7/2007 | Anderson et al. | |
| 2004/0001616 A1* | 1/2004 | Gutta et al. | 382/118 |
| 2005/0054381 A1 | 3/2005 | Lee et al. | |
| 2005/0075934 A1* | 4/2005 | Knight et al. | 705/15 |
| 2007/0112574 A1 | 5/2007 | Greene | |
| 2008/0159634 A1* | 7/2008 | Sharma et al. | 382/224 |
| 2008/0215975 A1* | 9/2008 | Harrison et al. | 715/706 |
| 2008/0235111 A1* | 9/2008 | Dotan et al. | 705/27 |

OTHER PUBLICATIONS http://www.marketingpower2.com/blog/journalofmarketing/2006/10/the_influence_of_avatars_on_on.html.*
"Facial and bodily expressions for control and adaptation of game", Nijholt Anton et al. 2008, abstract.*
U.S. Appl. No. 11/872,557, filed Oct. 15, 2007, Huang et al.

* cited by examiner

*Primary Examiner* — Jami A Plucinski
*Assistant Examiner* — Kira Nguyen
(74) *Attorney, Agent, or Firm* — Yee & Associates, P.C.; William Stock

(57) ABSTRACT

Generating popularity ratings for virtual world artifacts based on how often and in what manner avatars access the artifacts is provided. The popularity ratings for virtual world artifacts may be used to determine what virtual world artifacts are selected to have a prominent presence in a virtual world. When an event caused by an avatar accessing a virtual world artifact in a virtual world is detected, the illustrative embodiments receive information about the event, such as the event type, the avatar identifier (ID), and the time the event occurred. The illustrative embodiments generate a rating score for the virtual world artifact based on the information received about the event. The illustrative embodiments update a rendering of the virtual world artifact in the virtual world based on the rating score.

19 Claims, 5 Drawing Sheets

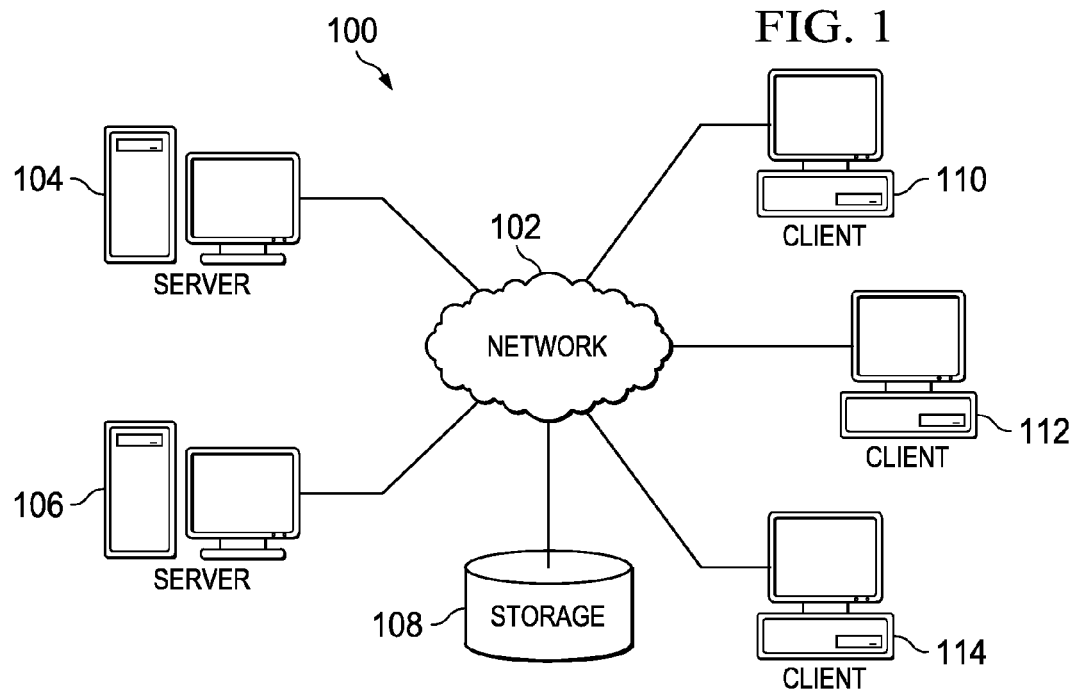
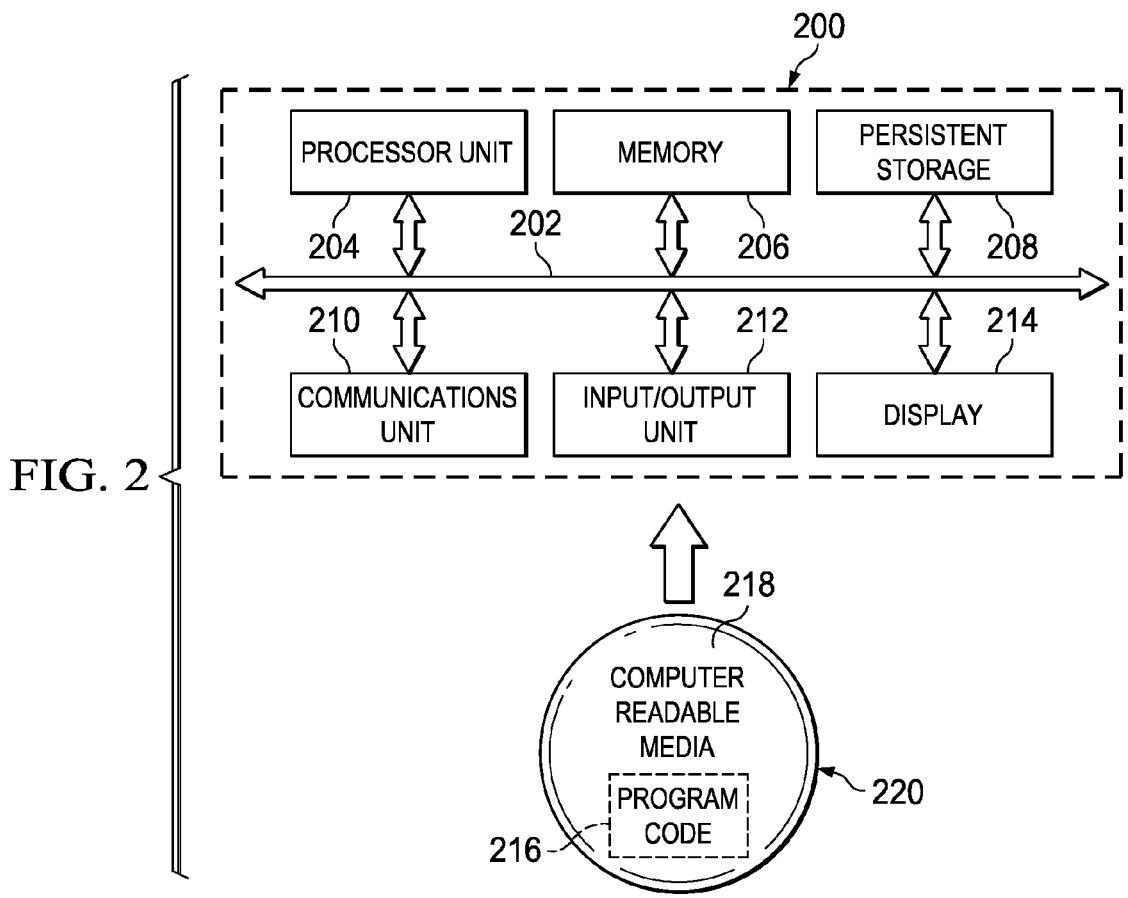

RATING VIRTUAL WORLD MERCHANDISE BY AVATAR VISITS

BACKGROUND OF THE INVENTION

1. Field of the Invention

The present invention relates generally to an improved data processing system, and in particular, to a computer implemented method and apparatus for processing software applications that have a virtual world interface. Still more particularly, the present invention relates to a computer implemented method, apparatus, and computer usable program code for a rating system to assign a score to virtual world merchandise according to how often the merchandise is accessed by avatars visiting the land where the virtual world merchandise is located.

2. Description of the Related Art

A software application is a system implemented in software for accomplishing a given purpose. A Web application is a software application having a client-side component and a server-side component linked together through a Web server. The client-side component is in the form of Web pages, whereas the server-side component can be built using a variety of technologies such as JSP (JavaServer Page), Java Servlet, and PHP. The Web pages define the user interface (UI) through declarative languages, such as Hypertext Markup Language (HTML) and Extensible Markup Language (XML), and logic using scripting languages such as JavaScript. The Web browser on the client device processes and displays the Web pages. The client Web pages use Hypertext Transfer Protocol (HTTP) to communicate with a Web server that links client requests to proper server components that perform processing which typically includes database access and enterprise business logic, such as e-commerce. The server components respond through the Web server, which uses HTTP to send the response back to the client.

A virtual world is a software application that provides a computer-based simulated environment in which virtual characters, called avatars, can reside, visit different places, and interact with one another. A virtual world environment is typically represented in a 3D representation that mimics the real-world environment. Avatars are representations of people residing in the virtual worlds.

Existing virtual world software systems focus on using the virtual world environment to model real-world systems. However, the virtual world presentation in these existing virtual world software systems is statically built and is not adaptive to state changes in the virtual world environment. This static nature of the existing virtual world presentation is in contrast to the Web applications, e-commerce applications in particular, in which content and information displayed to the user can be highly adaptive to the preferences of the user.

Thus, it would be beneficial to enable virtual world systems to allow their applications to be context aware, thereby providing richer user experiences and a higher chance of transaction of e-commerce applications. In addition, it would also be advantageous to have a rating system for determining which virtual world artifacts are favored by general avatars that visit the land where these virtual world artifacts reside.

BRIEF SUMMARY OF THE INVENTION

The illustrative embodiments provide a computer implemented method and apparatus to generate popularity ratings for virtual world artifacts based on how often and in what manner avatars access the artifacts. The popularity ratings for virtual world artifacts may be used to determine what virtual world artifacts are selected to have a prominent presence in a virtual world. When an event caused by an avatar accessing a virtual world artifact in a virtual world is detected, the illustrative embodiments receive information about the event, such as the event type, the avatar identifier (ID), and the time the event occurred. The illustrative embodiments generate a rating score for the virtual world artifact based on the information received about the event. The illustrative embodiments update a rendering of the virtual world artifact in the virtual world based on the rating score.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a distributed data processing system in which the illustrative embodiments may be implemented;

FIG. 2 is a block diagram of a data processing system in which the illustrative embodiments may be implemented;

DETAILED DESCRIPTION OF THE INVENTION

Figure 3:
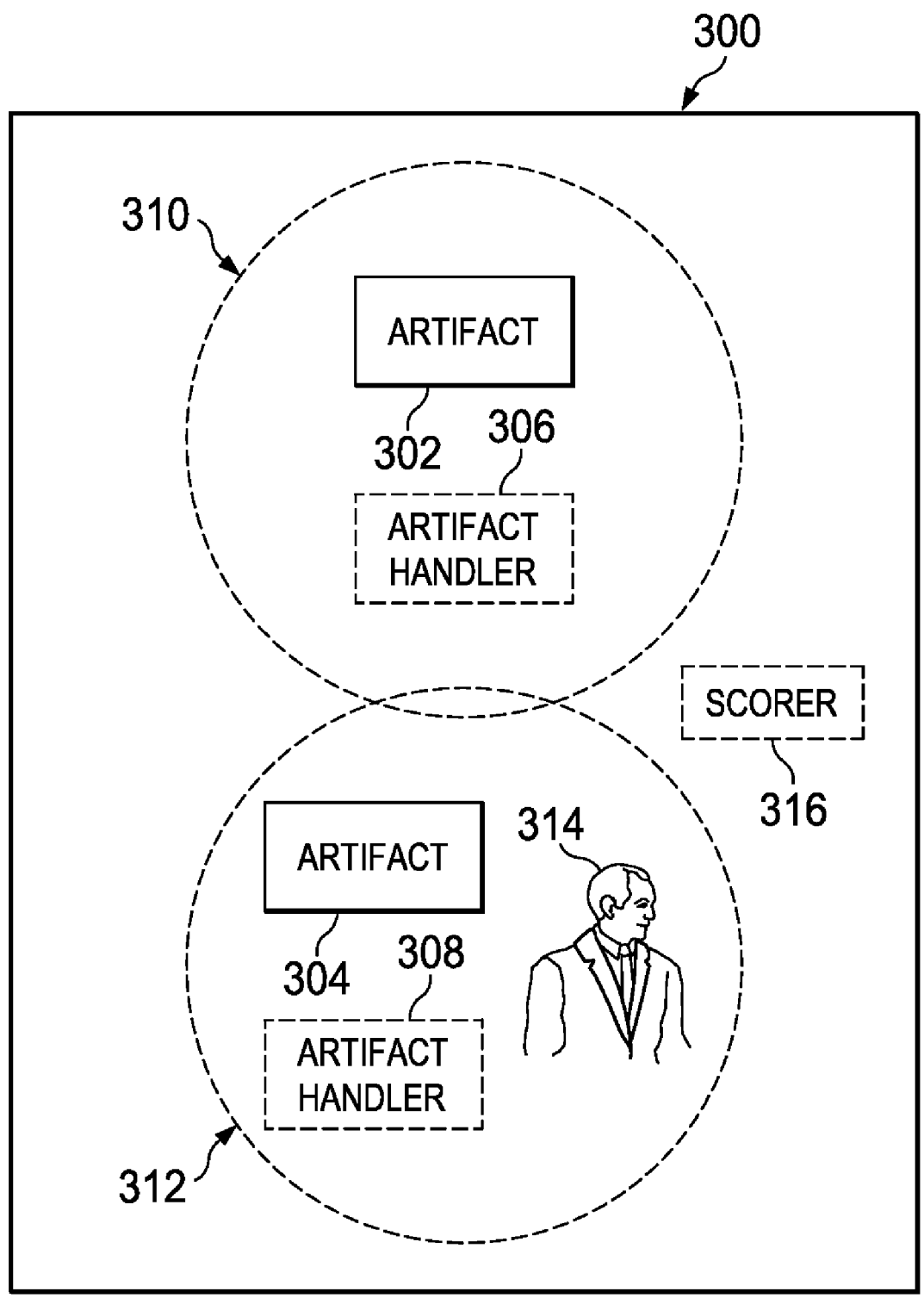
FIG. 3 depicts a pictorial representation of a virtual world land in accordance with the illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache that may be present in communications fabric 202.

The illustrative embodiments provide a context-aware virtual world system which allows for determining which virtual world artifacts are favored by general avatars that visit the virtual land in which these virtual world artifacts reside. The virtual world system of the illustrative embodiments employ software systems that comprise a virtual world interface and a backend system (virtual world artifact management system) that keeps track of artifacts or merchandise displayed in the virtual world. An example of such a software system is an e-commerce application with a virtual store in a virtual world system.

The illustrative embodiments allow the content of the virtual land to be adapted to display different content based on how often or the manner in which avatars access virtual world artifacts in the virtual world. An avatar may access an artifact in a virtual land using different access patterns. The access patterns define what constitutes "access" of an artifact by an avatar. One example of an access pattern comprises movement of the avatar within a pre-determined distance from the virtual world artifact. Another example of an access pattern is the touching of the virtual world artifact by the avatar. A third example of an access pattern is a reference to the virtual world artifact by the avatar in a monitored conversation of the avatar. A fourth example of an access pattern is a purchase transaction of a virtual world artifact from a virtual world store by the avatar.

The illustrative embodiments allow an avatar accessing a virtual world artifact to trigger one or more changes to the presentation of the artifact. For example, when an avatar approaches a target artifact, the visual display may zoom in on the artifact, thereby making it larger and possibly clearer in view. When an avatar touches a target artifact, a window may pop up with detailed information and hyperlinks to reference Web pages for the artifact. When an avatar touches a target artifact, a better representation of the target artifact may be shown with a larger and more refined rendering, as well as allow the user to control the viewing angle, such as by rotating the view.

Within the virtual world, virtual world merchandise or virtual world artifacts may be rendered as 3D product items in a virtual store. A virtual store is an island or a piece of land in a virtual world, which is presented as a 3D commercial store simulating the real-life stores. The illustrative embodiments allow for determining the prominence, in terms of presence, of a virtual world artifact in either a virtual land or in a virtual store by a rating score associated with this artifact. The rating score is used to indicate the popularity of the artifact based on the number of times the object is accessed by visiting avatars. For example, an artifact with a high popularity rating score will be displayed in a graphical manner to draw a user's attention to the artifact before other artifacts present in the display if the rating score is a high rating score, while an artifact with a low popularity rating score will be displayed in a graphical manner to decrease a user's attention to the artifact before other artifacts present in the display or removed from display altogether. For instance, an artifact with a high popularity rating score may be displayed more prominently either by being placed in a more visible spot, by having a larger size, or by being given a more elaborate and refined rendering. In contrast, an artifact with a low popularity rating score may be displayed in a more obscure spot, have a smaller size, or not be displayed at all. The illustrative embodiments also allow for calculating the popularity rating score associated with a virtual world artifact based on the number of times the artifact was accessed in a specific time window. Popularity rating scores associated with the virtual artifacts can be stored in an external system and used as one of the criteria that determine which artifacts are represented in a virtual land.

In addition, the illustrative embodiments allow different access patterns (e.g., an avatar approaching a target artifact or an avatar touching an avatar to cause visual changes) to result in different point values added to the popularity rating score of a target artifact. For example, the more closely an avatar approaches a target artifact, the more popularity rating points are given to the rating score of the artifact. In another example, the longer an avatar touches a target artifact, the more popularity rating points are given to the rating score of the artifact.

The illustrative embodiments also allow different popularity rating points to be given to a target artifact based on which avatars access the target artifact. For example, when an avatar that has engaged in many e-commerce transactions accesses the target artifact, more popularity rating points may be given to the target artifact in contrast with an avatar with few or no e-commerce transactions when accessing the same target artifact.

FIG. 3 depicts a pictorial representation of an exemplary virtual world land in accordance with the illustrative embodiments. A virtual land, such as virtual land 300 in FIG. 3, may comprise any shape and size. Thus, the dimensions of virtual land 300 are provided for illustration purposes only, as the virtual land is not limited to the particular dimensions shown.

In this illustrative example, two virtual world artifacts, artifacts 302 and 304, are presented in virtual land 300. Virtual land 300 may comprise any number of artifacts. The number of artifacts shown in virtual land 300 is provided for illustration purposes only, as the virtual land may have any arbitrary number of artifacts.

Each virtual world artifact in virtual land 300 is associated with a virtual world artifact handler. As shown in virtual land 300, artifact handler 306 is associated with artifact 302, and artifact handler 308 is associated with artifact 304. Artifact handlers 306 and 308 are themselves virtual world artifacts which do not have a visual representation in virtual land 300.

Each of the two dotted circles 310 and 312 represents a pre-specified distance around each of virtual world artifacts 302 and 304. When an avatar, such as avatar 314, moves within this pre-specified distance of a virtual world artifact, the artifact handler for this artifact detects this movement event. In response, the artifact handler initiates an access rating for the artifact by sending the movement event information to scorer 316. For example, artifact handler 308 associated with artifact 304 may detect the movement of avatar 314 within the pre-specified distance around virtual world artifact 304. Artifact handler 308 sends the movement event information to scorer 316 which then calculates a rating score for the artifact based on the event information obtained from the associated artifact handler. The event information provided to scorer 316 may include, but is not limited to, the type of event which was detected (e.g., movement), how near the avatar came to the artifact, the length of time the avatar touched the artifact, among other information. The rating score for the artifact represents the popularity of the particular artifact among the avatars in virtual land 300 based on the number of times the artifact is accessed by the visiting avatars. As previously mentioned, an avatar may access an artifact by moving within a pre-specified distance of the artifact, by touching the artifact, by referencing the artifact in a monitored conversation, or by purchasing the artifact from a virtual store.

Scorer 316 is a virtual world artifact without a visual representation in virtual land 300. Scorer 316 collects event information from artifact handlers 306 and 308 and formulates a rating score for virtual world artifacts 302 and 304 presented in virtual land 300. After calculating a rating score for a virtual world artifact, scorer 316 may send this rating score to an external system for further processing in order to calculate a popularity rating index for this artifact based on the average rating scores in a historical time window. The popularity rating indices for all artifacts can be used to determine how the artifacts are presented in virtual land 300. Thus, with the illustrative embodiments, an artifact with a high rating score may be displayed more prominently either by being placed in a more visible spot, by having a larger size, or by being given a more attractive rendering. An artifact with a low rating score may be displayed in a more obscure spot, have a smaller size, or not be displayed at all. In addition, the content of virtual land 300 may be adapted to display different artifacts based on the preference information associated with the avatars that are currently visiting the land.

Figure 4:
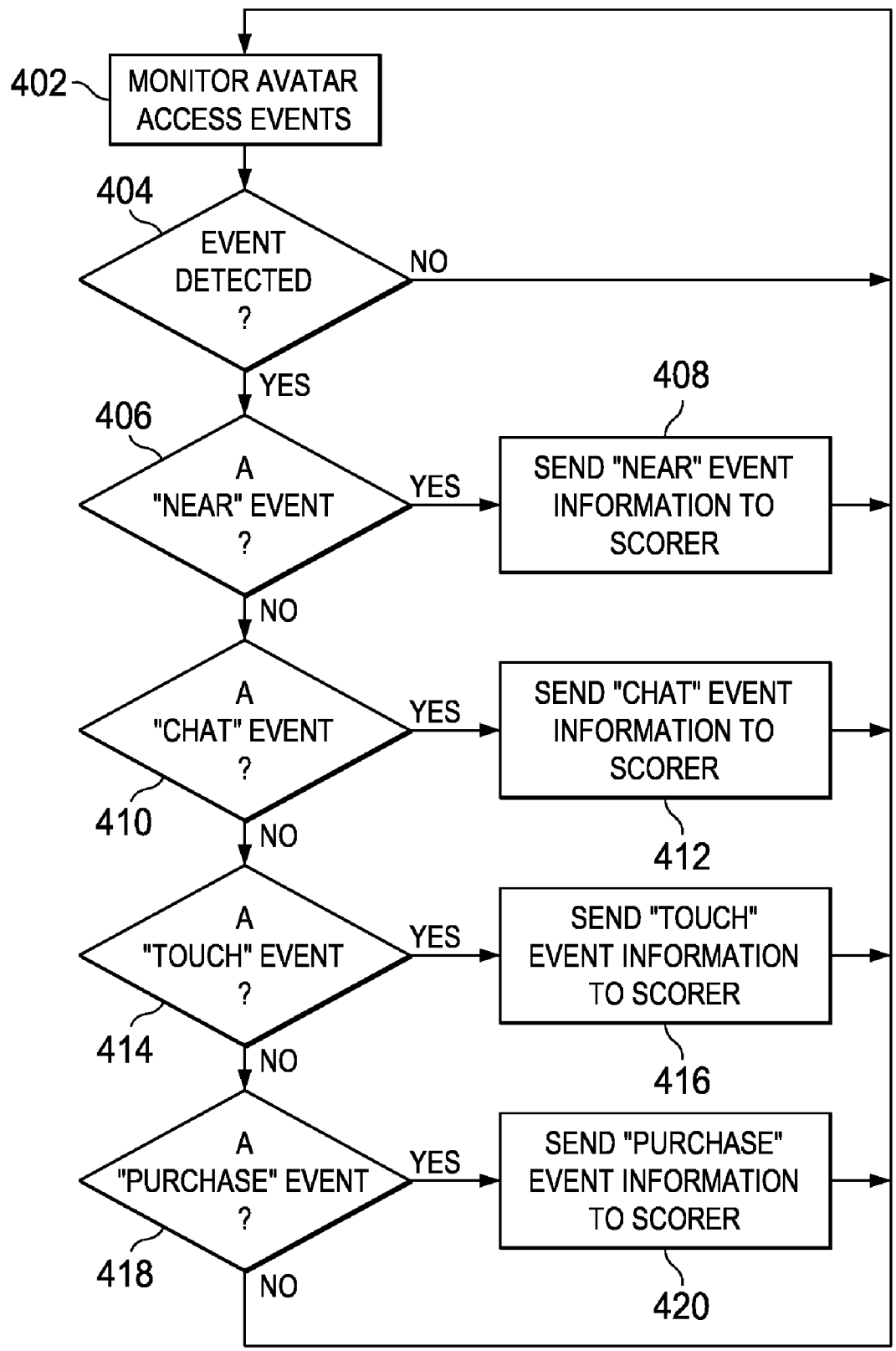
FIG. 4 depicts a flowchart illustrating the process of an artifact handler in accordance with the illustrative embodiments.

FIG. 4 depicts a flowchart illustrating the process of an artifact handler in accordance with the illustrative embodiments. The artifact handler is an example of artifact handlers 306 and 308 in FIG. 3. The process begins with the artifact handler monitoring the virtual land for artifact access events (step 402). In a system capable of asynchronous event propagation, the artifact handler can pre-define event listeners for various events, e.g., a "near" event, a "chat" event, a "touch" event, and a "purchase" event. The particular event types are based on the detectable avatar events supported by the underlying virtual world systems. In one embodiment, the event listener is written to use an event-listening API in order to catch the avatar events as the events occur. The artifact handler may sleep and is only awaken when a listener notifies the artifact handler that an event has occurred. In a system that does not support synchronous event propagation, the artifact handler may sleep and periodically wake up to monitor its environment and detect if an avatar access event has occurred. When an avatar access event is detected by the artifact handler, the artifact handler processes the event based on type of the access event.

A determination is made by the artifact handler whether an access event has been detected (step 404). If an access event has not been detected ('no' output of step 404), the process loops back to step 402 to continue monitoring for access events. If an access event has been detected ('yes' output of step 404), the artifact handler next determines the event type of the detected access event.

The artifact handler determines if the access event is an event type that the artifact handler monitors. The event type may be coded as a smaller integer and is passed from the event listener to the artifact handler when the event listener awakes the artifact handler with an avatar event. In one embodiment, the determination of event type is achieved through four conditional blocks 406, 410, 414, and 418. The particular order of determining the event type shown in FIG. 4 is for illustration purposes only, as other embodiments may employ a different event type evaluation order.

Turning to step 406, a determination is made by the artifact handler whether a "near" access event has occurred. A "near" access event may occur when an avatar enters within a pre-specified distance to a virtual world artifact. If the artifact handler determines that a "near" access event has occurred ('yes' output of step 406), the artifact handler invokes a procedure which generates a data structure that contains information about this event (e.g., the event type and the time when this event occurs together with the identifier (ID) of the virtual world artifact) and sends this "near" event information to the scorer (step 408). If the artifact handler determines that a "near" access event has not occurred ('no' output of step 406), the process continues to step 410.

At step 410, a determination is made by the artifact handler whether a "chat" access event has occurred. A "chat" event occurs when an avatar references the virtual world artifact in a conversation with other avatars or with a virtual sales clerk deployed in the virtual land. If the artifact handler determines that a "chat" event has occurred ('yes' output of step 410), the artifact handler invokes a procedure which generates a data structure that contains information about this event and the identifier (ID) of the virtual world artifact and sends this "chat" event information to the scorer (step 412). If the artifact handler determines that a "chat" access event has not occurred ('no' output of step 410), the process continues to step 414.

At step 414, a determination is made by the artifact handler whether a "touch" access event has occurred. A "touch" event occurs when an avatar visually touches a virtual world artifact. If the artifact handler determines that a "touch" event has occurred ('yes' output of step 414), the artifact handler invokes a procedure which generates a data structure that contains information about this event and the identifier (ID) of the virtual world artifact and sends this "touch" event information to the scorer (step 416). If the artifact handler determines that a "touch" access event has not occurred ('no' output of step 414), the process continues to step 418.

At step 418, a determination is made by the artifact handler whether a "purchase" access event has occurred. A "purchase" event occurs when an avatar purchases a virtual world artifact from a virtual store. If the artifact handler determines that a "purchase" event has occurred ('yes' output of step 418), the artifact handler invokes a procedure which generates a data structure that contains information about this event and the identifier (ID) of the virtual world artifact and sends this "purchase" event information to the scorer (step 420). If the artifact handler determines that a "purchase" access event has not occurred ('no' output of step 418), the process loops back to step 402 to continue monitoring for access events.

The process described in FIG. 4 shows four types of avatar access events (e.g., "near" event, "chat" event, "touch" event, and "purchase" event). The illustrative embodiments also allow an artifact handler to process more than these event types. For example, in a virtual world system with e-commerce features, an avatar may purchase real merchandise through the virtual world interface. Such e-commerce activities can trigger "buy" events that artifact handler generates for merchandise artifacts that are part of the transaction.

Figure 5:
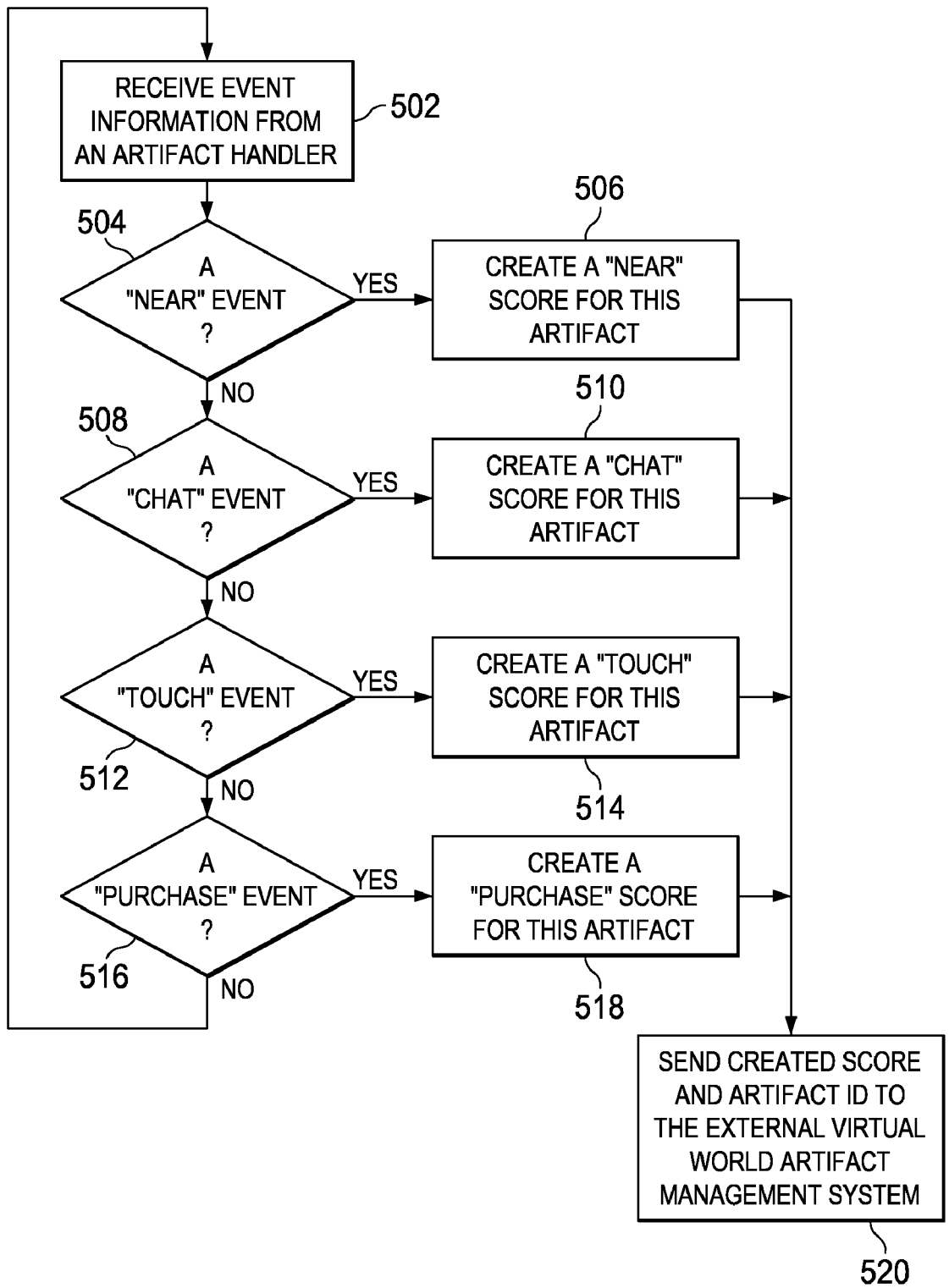
FIG. 5 depicts a flowchart illustrating the process of a scorer in accordance with the illustrative embodiments.

FIG. 5 depicts a flowchart illustrating the process of the scorer in accordance with the illustrative embodiments. The scorer is an example of scorer 316 in FIG. 3. The process begins with the scorer receiving access event information from an artifact handler, such as artifact handlers 306 and 308 in FIG. 3 (step 502). The access event information provided by the artifact handler may include the access event type and the artifact ID.

The scorer then determines the event type of received event information. The determination of event type is achieved through four conditional blocks 504, 508, 512, and 516. The particular order of determining the event type shown in FIG. 5 is for illustration purposes only, as other embodiments may employ a different event type evaluation order.

Turning to step 504, a determination is made by the scorer whether the access event type is a "near" event. If the event type is a "near" event ('yes' output of step 504), then the scorer proceeds to create a "near" score for the associated artifact (step 506). If the event type is not a "near" event ('no' output of step 504), the process continues to step 508.

At step 508, a determination is made by the scorer whether the access event type is a "chat" event. If the event type is a "chat" event ('yes' output of step 508), the scorer proceeds to create a "chat" score for the associated artifact (step 510). If the event type is not a "chat" event ('no' output of step 508), the process continues to step 512.

At step 512, a determination is made by the scorer whether the access event type is a "touch" event. If the event is a "touch" event ('yes' output of step 512), the scorer proceeds to create a "touch" score for the associated artifact (step 514). If the event type is not a "touch" event ('no' output of step 512), the process continues to step 516.

At step 516, a determination is made by the scorer whether the access event type is a "purchase" event. If the event is a "purchase" event ('yes' output of step 516), the scorer proceeds to create a "purchase" score for the associated artifact (step 518). If the event type is not a "purchase" event ('no' output of step 516), the process loops back to step 502 to continue receiving access event information from the artifact handlers.

After a score for the detected access event is generated in steps 506, 510, 514, or 518, the scorer sends this newly created score together with the identifier (ID) of the associated artifact to the virtual world artifact management system that may be located in an external server, such as a Web server (step 520).

The access events presented in the illustrative embodiments may be recurring in nature, meaning that an access event may continuously be created at fixed intervals by artifact handlers as long as the condition contributing to this event persists. For example, an avatar moving within a prespecified distance from a virtual world artifact may trigger a "near" event. While the avatar stays within this distance, the artifact handler of the visited artifact may continuously create a "near" event at fixed intervals. Thus, the longer the visiting avatar stays within this pre-specified distance, the more score points will be attributed to the visited artifact, thereby resulting an overall higher rating score for this artifact.

The rating scores associated with different event types may be different. For example, a "touch" event may result in a higher score than a "chat" event, which may in turn result in a higher score than a "near" event. A virtual world system with e-commerce features may generate "purchase" events based on e-commerce transactions. The "purchase" event may result in a higher rating score over the other event types.

The communication between artifact handlers and the scorer may be either synchronous or asynchronous. Synchronous communication from an artifact handler to the scorer is exemplified by the method-calling pattern in software development. For example, when an artifact handler needs to send event information to the scorer, the artifact handler sends the information by calling a method of the scorer, passing in the event information as the method parameter. Asynchronous communication from an artifact handler to the scorer may be achieved by a variety of ways, including for example message passing or message queue.

The communication between the scorer and the virtual world artifact management system may be based on a messaging protocol such as HTTP. The virtual world artifact management system may be implemented as a Web application that receives rating score data from the scorer in a virtual world through a Web server. The scorer may buffer multiple event rating score data and send the data to the virtual world artifact management system as one message, thereby optimizing the network overhead.

Figure 6:
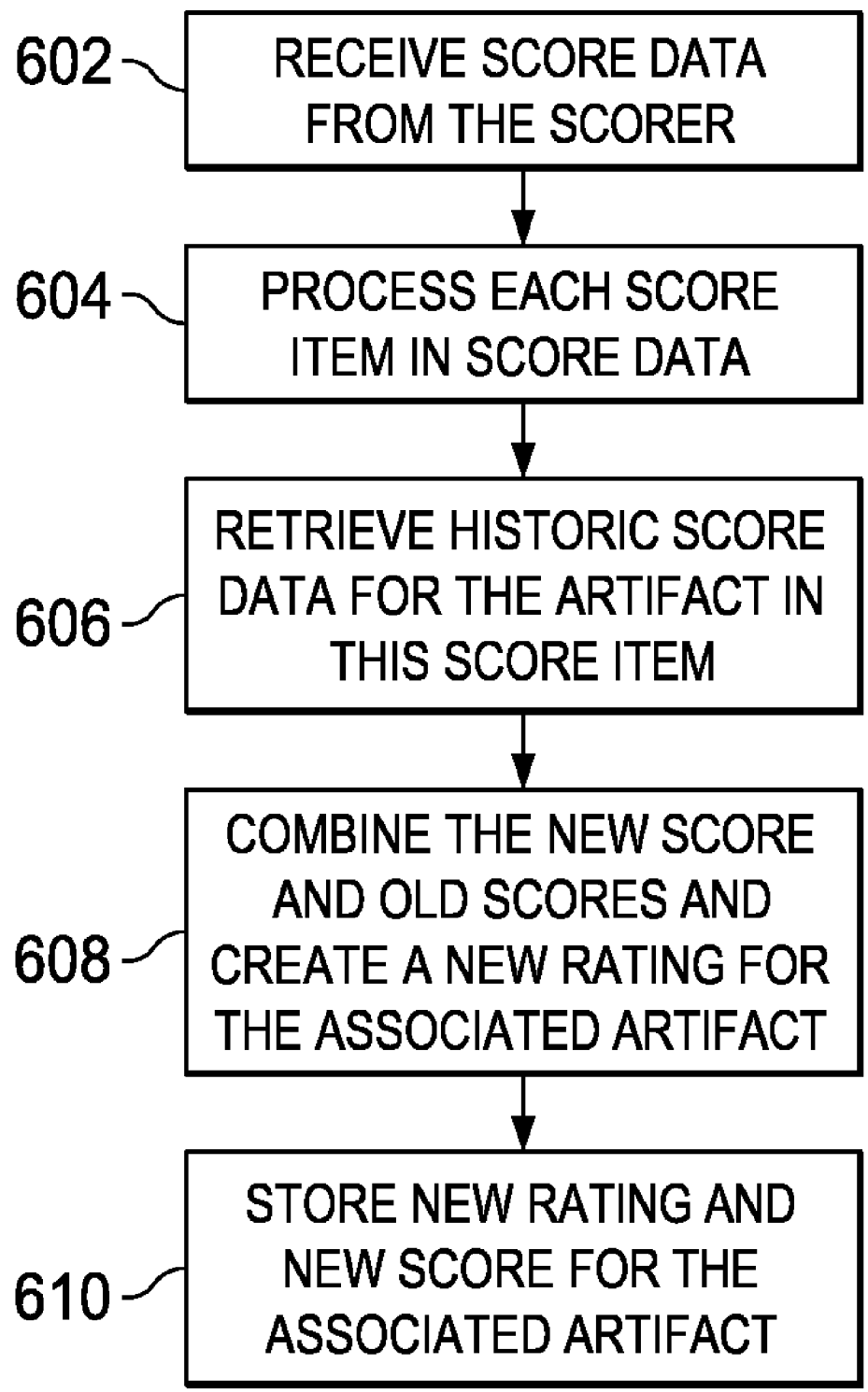
FIG. 6 depicts a flowchart illustrating the process of the virtual world artifact management system in accordance with the illustrative embodiments.

FIG. 6 depicts a flowchart illustrating the process of the virtual world artifact management system. The process begins in step 602 when the virtual world artifact management system receives the rating score data from the scorer, such as scorer 316 in FIG. 3. In one embodiment, the scorer may buffer multiple score items, each representing an avatar access event, into one message.

Next, the virtual world artifact management system processes each rating score item in the received rating score data in steps 604-610. In one embodiment, the present rating score may be used to combine with past scores within certain past time window to achieve an "average" score. To achieve this combination, for each rating score item in the received rating score data, the virtual world artifact management system retrieves the historic rating score data for the artifact associated with the rating score item in step 606. The virtual world artifact management system then combines the historic rating score data and the rating score item and generates a new rating score (e.g., the average score across a fixed time including the present score) for the associated artifact in step 608. The newly generated rating score is stored in a database in step 610. The new rating score is also stored as part of the historical scores for the associated artifact.

Aspects of the illustrative embodiments may also store a list of virtual world artifacts for a certain avatar, to which this avatar has accessed by invoking the aforementioned avatar access events. A rating may also be computed for and associated with each artifact accessed by this avatar based on only the scores incurred by avatar access events invoked by this avatar. This avatar-specific rating method allows the system to dynamically formulate a recommendation list based on the avatars present in the virtual store. The recommendation list created dynamically can then be used by the virtual world system to dynamically change to display artifacts that have an aggregated high rating among many or most or all avatars present in the store.

Once the new rating score has been generated for the artifact, the virtual world artifact management system may use the new rating score as a factor in determining how (and if) the virtual world artifacts are presented in the virtual world. For example, the virtual world artifact management system may give artifacts with higher rating scores a more prominent presentation in the virtual world, such as having a bigger 3D presentation or being placed in the center of a virtual store.

The generation of the new rating score for an artifact may be based on all rating scores associated with the artifact that are based on access events that occurred within a historical time window, e.g., during the previous year, the previous three years, etc. The new rating score may also be based on some mathematical formulae using the existing (historical) rating score and the new rating score as inputs.

Another example of a rating-based presentation system for virtual world artifacts is described below. This system has a virtual world interface, e.g., a virtual store, which may only display a portion of the merchandise it sells in the virtual world. Initially, many or all merchandise items are displayed in the virtual store for an equal period of time on a rotating basis. When popularity rating scores are collected by the scorer and computed for items that have been displayed, these rating scores are used by the virtual world artifact management system to change the presentation of artifacts in the virtual store. Given the limited display slots in the virtual store, only items with a rating score higher than a certain value may be displayed. In addition, artifacts with low rating scores which are currently displayed in the store are replaced by other artifacts on a rotating basis so as to give other artifacts an opportunity to be displayed in the virtual store.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for rating virtual world artifacts, the computer implemented method comprising the steps of:
    responsive to a computer detecting an event caused by an avatar accessing a virtual world artifact in a virtual world, receiving, by the computer, information about the event;
    generating, by the computer, a rating score value for the virtual world artifact based on the information received about the event;
    increasing, by the computer, the generated rating score value based on a number of times the virtual world artifact is accessed by the avatar within a predetermined period of time; and
    updating, by the computer, a rendering of the virtual world artifact in the virtual world based on the generated rating score value by increasing a size of the virtual world artifact in relation to other artifacts present in a display of the virtual world if the generated rating score value is a high rating score value and decreasing the size of the virtual world artifact in relation to the other artifacts present in the display if the generated rating score value is a low rating score value.

2. The computer implemented method of claim 1, wherein the information about the event includes an access type of the event.

3. The computer implemented method of claim 2, wherein the information about the event includes an identifier of the virtual world artifact and a time when the event occurred.

4. The computer implemented method of claim 2, wherein the access type of the event is movement of the avatar within a predefined distance of the virtual world artifact.

5. The computer implemented method of claim 2, wherein the access type of the event is a reference to the virtual world artifact in a monitored conversation of the avatar.

6. The computer implemented method of claim 2, wherein the access type of the event is touching of the virtual world artifact by the avatar.

7. The computer implemented method of claim 2, wherein the access type of the event is a purchase transaction of a virtual world artifact by the avatar.

8. The computer implemented method of claim 2, further comprising the step of:
    generating, by the computer, a different rating score value for each different access type of the event by generating a first rating score value for a near event associated with the virtual world artifact, a second rating score value for a chat event associated with the virtual world artifact that is greater than the first rating score value, a third rating score value for a touch event associated with the virtual world artifact that is greater than the second rating score value, and a fourth rating score value for a purchase event associated with the virtual world artifact that is greater than the third rating score value.

9. The computer implemented method of claim 8, further comprising the step of:
    sending, by the computer, at least one of the first rating score value, the second rating score value, the third rating score value, and the fourth rating score value along with identity information about the virtual world artifact to a remote server to generate a new rating score value for the virtual world artifact.

10. The computer implemented method of claim 1, wherein the step of generating, by the computer, the rating score value for the virtual world artifact comprises the computer combining a rating score value resulting from the event and a historical rating score value of the virtual world artifact.

11. The computer implemented method of claim 1, wherein the generated rating score value is used to determine a display prominence of the virtual world artifact in the virtual world.

12. A data processing system for rating virtual world artifacts, the data processing system comprising:
    a bus;
    a storage device connected to the bus, wherein the storage device stores computer usable code;
    at least one managed device connected to the bus;
    a communications unit connected to the bus; and
    a processing unit connected to the bus, wherein the processing unit executes the computer usable code to receive, in response to detecting an event caused by an avatar accessing a virtual world artifact in a virtual world, information about the event; generate a rating score value for the virtual world artifact based on the information received about the event; increase the generated rating score value based on a number of times the virtual world artifact is accessed by the avatar within a predetermined period of time; and update a rendering of the virtual world artifact in the virtual world based on the generated rating score value by increasing a size of the virtual world artifact in relation to other artifacts present in a display of the virtual world if the generated rating score value is a high rating score value and decreasing the size of the virtual world artifact in relation to the other artifacts present in the display if the generated rating score value is a low rating score value.

13. A computer program product stored on a computer readable storage device having computer usable program code embodied thereon that is executable by a computer for rating virtual world artifacts, the computer program product comprising:

computer usable program code for receiving, by a computer, in response to the computer detecting an event caused by an avatar accessing a virtual world artifact in a virtual world, information about the event;

computer usable program code for generating, by the computer, a rating score value for the virtual world artifact based on the information received about the event;

computer usable program code for increasing, by the computer, the generated rating score value based on a number of times the virtual world artifact is accessed by the avatar within a predetermined period of time; and computer usable program code for updating, by the computer, a rendering of the virtual world artifact in the virtual world based on the generated rating score value by increasing a size of the virtual world artifact in relation to other artifacts present in a display of the virtual world if the generated rating score value is a high rating score value and decreasing the size of the virtual world artifact in relation to the other artifacts present in the display if the generated rating score value is a low rating score value.

14. The computer program product of claim 13, wherein the information about the event includes an access type of the event.

15. The computer program product of claim 14, wherein the access type of the event is at least one of movement of the avatar within a predefined distance of the virtual world artifact, a reference to the virtual world artifact in a monitored conversation of the avatar, touching of the virtual world artifact by the avatar, or a purchase transaction of a virtual world artifact by the avatar.

16. The computer program product of claim 13, wherein the computer usable program code for generating, by the computer, the rating score value for the virtual world artifact comprises computer usable program code for combining, by the computer, a rating score value resulting from the event and a historical rating score value of the virtual world artifact.

17. The computer program product of claim 13, wherein the generated rating score value is used to determine a display prominence of the virtual world artifact in the virtual world.

18. The computer implemented method of claim 1, further comprising the step of:

displaying, by the computer, a pop-up window that includes detailed information about the virtual world artifact and a hyperlink that references a Web page associated with the virtual world artifact when the avatar touches the virtual world artifact.

19. The computer implemented method of claim 1, wherein the virtual world artifact accessed by the avatar in the virtual world is one of a plurality of virtual world artifacts, and wherein each virtual world artifact in the plurality of virtual world artifacts is associated with its own virtual world artifact handler that monitors access events of an associated virtual world artifact, and wherein the virtual world artifact handler is an artifact in the virtual world that does not have a visual representation in the virtual world.

\* \* \* \* \*